United States Patent
Yeon et al.

(10) Patent No.: US 12,507,183 B2
(45) Date of Patent: Dec. 23, 2025

(54) WIRELESS COMMUNICATIONS DEVICE FOR TRANSMITTING UPLINK SIGNAL AND OPERATING METHOD THEREOF

(71) Applicant: SAMSUNG ELECTRONICS CO., LTD., Suwon-si (KR)

(72) Inventors: Haedong Yeon, Suwon-si (KR); Joohyun Do, Suwon-si (KR); Hyunseok Yu, Suwon-si (KR); Youngik Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 238 days.

(21) Appl. No.: 18/348,805

(22) Filed: Jul. 7, 2023

(65) Prior Publication Data
US 2024/0031952 A1    Jan. 25, 2024

(30) Foreign Application Priority Data
Jul. 22, 2022   (KR) .................. 10-2022-0091317

(51) Int. Cl.
*H04W 52/36* (2009.01)
*H04W 52/32* (2009.01)

(52) U.S. Cl.
CPC ....... *H04W 52/367* (2013.01); *H04W 52/325* (2013.01)

(58) Field of Classification Search
None
See application file for complete search history.

(56) References Cited

U.S. PATENT DOCUMENTS

| | | | |
|---|---|---|---|
| 10,447,222 B2 | 10/2019 | Scott et al. | |
| 10,658,981 B2 | 5/2020 | Briffa et al. | |
| 11,128,517 B2 | 9/2021 | Larsson et al. | |
| 2011/0044299 A1* | 2/2011 | Spencer | H04W 52/262 370/336 |
| 2013/0033326 A1* | 2/2013 | Acosta-Serafini | H03G 3/3052 330/278 |
| 2020/0154372 A1* | 5/2020 | Chae | H04W 52/383 |
| 2021/0320829 A1 | 10/2021 | Kim et al. | |

FOREIGN PATENT DOCUMENTS

| | | |
|---|---|---|
| JP | 6296604 | 3/2018 |
| JP | 6776699 | 10/2020 |
| KR | 10-2016-0149886 | 12/2016 |

* cited by examiner

*Primary Examiner* — Robert M Morlan
(74) *Attorney, Agent, or Firm* — Morgan, Lewis & Bockius LLP

(57) ABSTRACT

An operating method of a wireless communications device includes identifying a modulation order and resource allocation information of a first uplink signal transmitted in a first symbol and a second uplink signal transmitted in a second symbol preceding the first symbol, controlling a difference between a supply modulator output voltage value for the first uplink signal and a supply modulator output voltage value for the second uplink signal, based on the identified order or information, and transmitting the first uplink signal, based on the controlled difference between the supply modulator output voltage values.

20 Claims, 17 Drawing Sheets

WIRELESS COMMUNICATIONS DEVICE FOR TRANSMITTING UPLINK SIGNAL AND OPERATING METHOD THEREOF

CROSS-REFERENCE TO RELATED APPLICATION

This application claims priority under 35 U.S.C. § 119 to Korean Patent Application No. 10-2022-0091317, filed on Jul. 22, 2022, in the Korean Intellectual Property Office, the disclosure of which is incorporated by reference herein in its entirety.

FIELD

The present disclosure relates to a wireless communications device for transmitting uplink signals.

DISCUSSION

An error vector magnitude (EVM) may indicate a distortion degree of an ideal transmission signal versus a generated signal. EVM information may include at least one of additional white Gaussian noise (AWGN), power amplifier non-linearity, in-phase and quadrature (IQ) mismatch, phased noise, local oscillator leakage (LOL), digital-to-analog conversion (DAC) output noise, quantization noise and thermal noise.

A quadrature phase shift keying (QPSK) signal modulation scheme may convey 2-bit data simultaneously. In quadrature amplitude modulation (QAM) signal modulation schemes, the number of bits conveyed depends on the type of QAM. Thus, QPSK, 16 QAM, 32 QAM, 64 QAM, 128 QAM and 256 QAM respectively convey 2, 4, 5, 6, 7 and 8 bits. For example, modulation order numbers 2, 4, 6, and 8 may represent QPSK, 16 QAM, 64 QAM, and 256 QAM, respectively. The 3rd Generation Partnership Project (3GPP) specification defines transmission EVM requirements according to the modulation orders. In detail, the 3GPP specification (TS 38.101) requires 30.00% EVM for BPSK, 17.50% EVM for QPSK, 12.50% EVM for 16 QAM, 8% EVM for 64 QAM, and 3.50% EVM for 256 QAM. Thus, as the modulation order increases, a lower EVM is required, and corresponding methods may differ.

SUMMARY

Embodiments of the present disclosure provide a wireless communications device for transmitting uplink signals, and an operating method thereof.

According to an embodiment of the present disclosure, there is provided an operating method of a wireless communications device including identifying a modulation order and resource allocation information of a first uplink signal transmitted in a first symbol and a second uplink signal transmitted in a second symbol preceding the first symbol, controlling a difference between a supply modulator output voltage value for the first uplink signal and a supply modulator output voltage value for the second uplink signal based on the identified the identified modulation order or the identified resource allocation information, and transmitting the first uplink signal based on the controlled difference between the supply modulator output voltage values.

According to an embodiment of the present disclosure, there is provided a terminal in a wireless communications system, including: a transceiver and at least one processor connected to the transceiver. The at least one processor may be configured to identify a modulation order and resource allocation information of a first uplink signal transmitted in a first symbol and a second uplink signal transmitted in a second symbol preceding the first symbol, control a difference between a supply modulator output voltage value for the first uplink signal and a supply modulator output voltage value for the second uplink signal based on the identified modulation order or the identified resource allocation information, and transmit the first uplink signal based on the controlled difference between the supply modulator output voltage values via the transceiver.

According to an embodiment of the present disclosure, there is provided a wireless communications device including a supply modulator and a 256 QAM detecting module, comprising: a supply modulator configured to supply a voltage to a power amplifier modulator and a 256 QAM detecting module configured to identify a modulation order and resource allocation information of a first uplink signal transmitted in a first symbol and a second uplink signal transmitted in a second symbol preceding the first symbol, control an output voltage value of the supply modulator for the first uplink signal based on the identified modulation order or the identified resource allocation information, and control the wireless communications device to transmit the first uplink signal based on the controlled output voltage value of the supply modulator for the first uplink signal. A modulation order of the first uplink signal is 256 QAM.

BRIEF DESCRIPTION OF THE DRAWINGS

Embodiments will be more clearly understood from the following detailed description when taken in conjunction with the accompanying drawings, in which:

FIG. 3A illustrates operation of a wireless communications device for transmission of a sounding reference signal (SRS) symbol and a physical uplink shared channel (PUSCH) symbol, according to an embodiment, and FIGS. 3B and 3C illustrate an RF transient time according to an embodiment;

DETAILED DESCRIPTION

Figure 1:
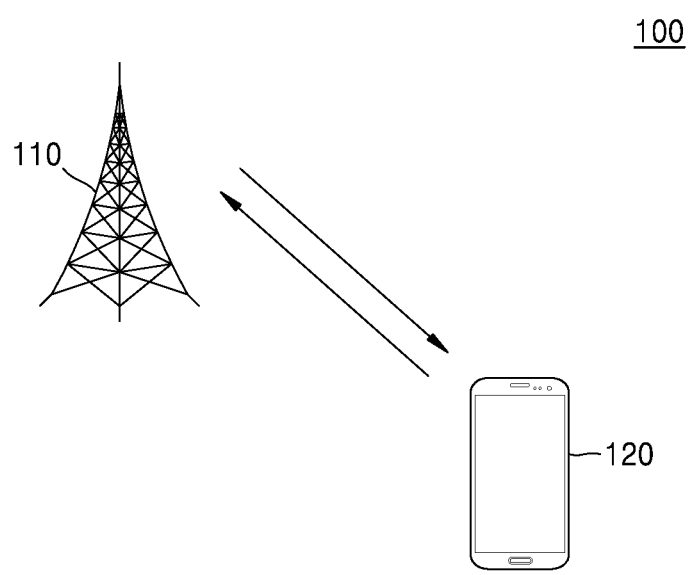
FIG. 1 is a conceptual diagram that illustrates a wireless communications system according to an embodiment.

According to illustrative embodiments of the present disclosure, a base station (BS) communicates with a wireless communications device, and may include, as an entity allocating communications network resources to the wireless communications device, cells, NodeBs (NBs), eNodeBs (eNBs), next-generation radio access networks (NG-RANs), radio access units, base station controllers, nodes on a network, gNodeBs (gNBs), transmission and reception points (TRPs), and remote radio heads (RRHs).

The wireless communications device is an entity that communicates with a base station (BS) or other wireless communications device and may be referred to by other names, such as nodes, user equipment (UE), next generation (NG) UE, mobile stations (MSs), mobile equipment (ME), devices, and/or terminals.

In addition, the wireless communications device may be or include at least one of smartphones, tablet personal computers (PCs), mobile phones, video phones, e-book readers, desktop PCs, laptop PCs, netbook computers, personal data assistants (PDAs), portable multimedia players (PMPs), Moving Picture Experts Group Layer-3 Audio (MP3) players, medical devices, cameras, or wearable devices. In addition, the wireless communications device may include at least one of televisions (TVs), digital video disk (DVD) players, audio systems, refrigerators, air conditioners, vacuum cleaners, ovens, microwave ovens, washing machines, air purifiers, set-top boxes (STBs), home automation control panels, security control panels, media boxes (e.g., Samsung HomeSync™, Apple TV™, Google TV™), game consoles (e.g., Xbox™, PlayStation™), electronic dictionaries, electronic keys, camcorders, or electronic picture frames. In addition, the wireless communications device may include at least one of various medical devices (e.g., various portable medical measurement devices such as a blood glucose meter, a heart rate instrument, a blood pressure instrument, or a body temperature instrument), magnetic resonance angiography (MRA), magnetic resonance imaging (MRI), computed tomography (CT), cameras, or sonicators (e.g., ultrasound), navigation devices, satellite navigation systems such as global navigation satellite system (GNSS) or global positioning system (GPS), event data recorders (EDRs), flight data recorders (FDRs), automotive infotainment devices, marine electronic equipment (e.g., navigation devices for ships, gyro compasses), avionics, security devices, head units for vehicles, industrial or household robots, drones, automated teller machines (ATMs) in financial institutions, point of sale (POS) devices in stores, or Internet of things (IoT) devices (e.g., light bulbs, various sensors, sprinkler devices, fire alarms, thermostats, street lights, toasters, exercise equipment, hot water tanks, heaters, boilers). In addition, the wireless communications device may include various types of multimedia systems capable of performing a communications function.

Hereinafter, embodiments will be described in greater detail with reference to the accompanying drawings.

FIG. 1 illustrates a wireless communications system according to an embodiment.

Referring to FIG. 1, a wireless communications system is indicated generally by the reference numeral 100, and may include a wireless communications device such as user equipment (UE) 120 and a base station (BS) 110. For convenience of description, the wireless communications system is illustrated as including one BS 110 and one UE 120, but this is merely an example, and the present disclosure is not limited thereto. For example, the wireless communications system may be implemented to include various numbers of BSs and UEs.

The BS 110 may be connected to the wireless communications device 120 through a wireless channel to provide various communications services. The BS 110 may provide a service through a shared channel for user traffic, and perform scheduling by collecting state information, such as a buffer state, an available transmit power state, and a channel state of the wireless communications device 120. The wireless communications system may support beamforming technology by using orthogonal frequency division multiplexing (OFDM) as a radio access technology, or the like. In addition, the wireless communications system may support an adaptive modulation & coding (AMC) scheme for determining a modulation scheme and a channel coding rate according to a channel state of the wireless communications device 120.

In addition, the wireless communications system may transmit and receive signals using a wide frequency band existing in a frequency band of 6 GHz or higher. For example, the wireless communications system may increase a data rate by using a millimeter wave band, such as a 28 GHz band or a 60 GHz band. Here, in the case of the millimeter wave band, signal attenuation per distance is relatively large, and the wireless communications system may support transmission/reception based on a directional beam generated using multiple antennas to secure coverage. The wireless communications system may be a system supporting multiple input, multiple output (MIMO), and accordingly, the BS 110 and the wireless communications device 120 may support a beamforming technology. The beamforming technology may be digital beamforming, analog beamforming, hybrid beamforming, and/or the like, and hereinafter, the present disclosure is described based on embodiments supporting the hybrid beamforming technology, but it shall be understood that the teachings of the present disclosure may also be applied to other beam forming technologies as well.

Referring to FIG. 1, when transmitting an uplink signal based on 256 QAM, the wireless communications device 120 may control a transient time of a supply modulator by controlling an output voltage of the supply modulator for a corresponding signal. Accordingly, the wireless communications device 120 may reduce an error vector magnitude (EVM) of the uplink signal based on a 256 QAM signal modulation scheme. In addition, the wireless communications device 120 may optimize a bias current of a power amplifier, as well as controlling the output voltage of the supply modulator. Accordingly, the wireless communications device 120 may optimize its efficiency and/or overall power consumption.

Figure 2:
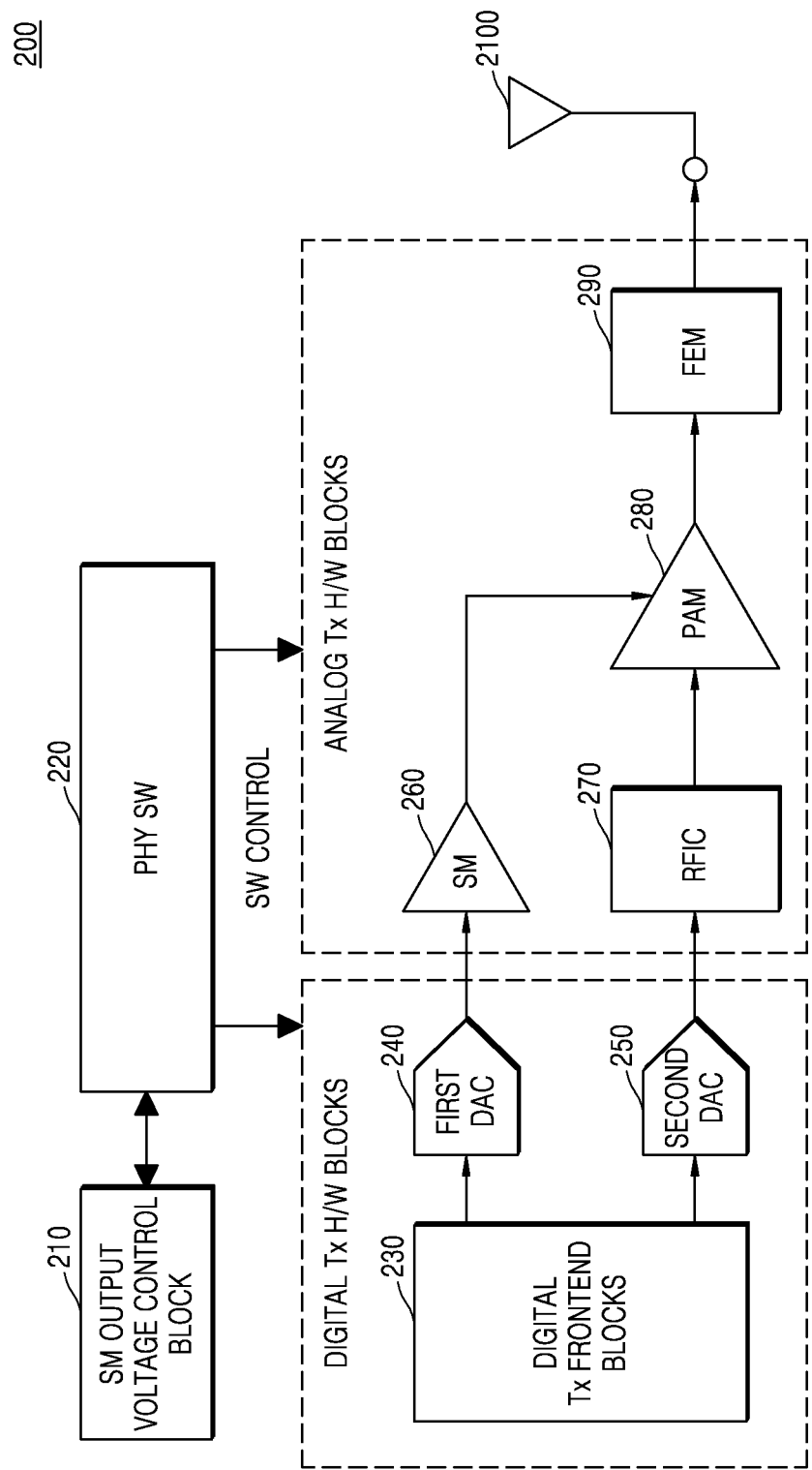
FIG. 2 is a block diagram that illustrates a wireless communications device according to an embodiment.

FIG. 2 illustrates an example of the wireless communications device 120 of FIG. 1 according to an embodiment.

A wireless communications device is indicated generally by the reference numeral 200, and may include an uplink transmit (Tx) frontend. The uplink Tx frontend may include a supply modulator (SM) output voltage control block 210, a digital Tx hardware (H/W) block, an analog Tx H/W block, physical layer software (PHY SW) 220 for controlling the digital Tx H/W block and the analog Tx H/W block, and an antenna 2100.

The digital Tx H/W block may include at least one of a digital Tx frontend block 230, a first digital-to-analog converter (DAC) 240, and a second DAC 250. The digital Tx frontend block 230 may include one or more digital filters, a gain control block, crest-factor reduction (CFR), digital predistortion (DPD) and envelop-tracking (ET) circuitry, and the like. The first DAC may refer to an ET/average power tracking (APT) DAC (ET/APT DAC). The second DAC 250 may refer to a main DAC.

The analog Tx H/W block may include at least one of a supply modulator (SM) 260, a radio frequency integrated circuit (RFIC) 270, a power amplifier modulator (PAM) 280, a frontend module (FEM) 290, and optionally the antenna 2100. The SM 260 may supply a supply voltage to the PAM 280. The PAM 280 may be a power amplifier (PA) 280, without limitation thereto. The SM 260 may also serve as a DC-DC converter. The RFIC 270 may include an analog baseband filter (ABB), a mixer, and a gain amplifier. The PAM 280 may amplify power. The FEM 290 may include a matching circuit, a switch, and a duplexer. The FEM 290 may match an output from the PAM 280 to the antenna 2100.

The PHY SW 220 may control at least one of the digital Tx H/W block and the analog Tx H/W block to output a desired Tx power at a desired timing. For example, the PHY SW 220 may generate in advance a look-up table (LUT) according to transmit power. In addition, the PHY SW 220 may transmit a set value for each block by using the LUT according to the transmit power generated in advance. In another embodiment, the PHY SW 220 may control at least one of supply power to the SM 260, a bias current of the PA 280, and a total current consumption of the wireless communications device 120, without using a LUT.

An SM output voltage control block 210 may determine whether to use the LUT based on 256 QAM. For example, when the wireless communications device 120 supports the LUT based on a 256 QAM signal modulation scheme, the wireless communications device 120 may determine whether to use based on 256 QAM by using the SM output voltage control block 210, when transmitting an uplink signal. The SM output voltage control block 210 may receive related information from the PHY SW 220, and may determine whether to use the LUT based on 256 QAM based on the received information. In addition, the SM output voltage control block 210 may transmit a determination result to the PHY SW 220.

A new radio (NR) uplink may have two signal types: cyclic prefix-orthogonal frequency divisional multiplexing (CP-OFDM) and discrete Fourier transform-spreading-OFDM (DFT-s-OFDM). Each of the two signals may have different signal characteristics, such as a peak to average power ratio (PAPR). Accordingly, RF units related to the uplink signal may be controlled based on any one of an LUT based on CP-OFDM and an LUT based on DFT-s-OFDM. Each of the LUT based on CP-OFDM and the LUT based on DFT-s-OFDM may include at least one of a bias of the PA 280, a mode of the PA 280, a Vcc output value of the SM 260, a gain of the RFIC 270, other settings of the RFIC, and a digital block setting. The PHY SW 220 may determine whether to use the first LUT or the LUT based on 256 QAM. The first LUT may include at least one of a LUT based on CP-OFDM and a LUT based on DFT-s-OFDM. The first LUT and the LUT based on 256 QAM may include at least one of supply power of (i.e., Vcc of the PA 280) the SM 260 according to transmit power, a bias current of the PA 280, and total current consumption information of the wireless communications device 120. Unlike the first LUT, the LUT based on 256 QAM may include at least one of the supply power of the SM 260 in a 256 QAM situation, the bias current of the PA 280, and the total current consumption information of the wireless communications device 120. The LUT based on 256 QAM described above may be extended and applied to a BPSK-based LUT, a QPSK-based LUT, a 16 QAM-based LUT, and a 64 QAM-based LUT according to a modulation order, and is not limited to the example of the LUT based on 250 QAM described above.

The PA 280 may be turned off, at a voltage below a certain Vcc value. Accordingly, because Vcc has to be maintained above a minimum voltage value, a transient time may not occur in a transmit power interval less than a transmit power value corresponding to the certain Vcc voltage value. In the present disclosure, the transmit power value corresponding to the certain Vcc voltage value may be referred to as a first transmit power value. The first transmit power value may also be referred to as $P_{vcc,min}$.

In an alternate embodiment, the SM output voltage control block 210 may be configured in software within the PHY SW 220. Also, the SM output voltage control block 210 may be configured in hardware as a separate block. As another embodiment, the SM output voltage control block 210 may be implemented to directly transmit a detection result to at least one of the digital Tx H/W block and the analog Tx H/W block. Although illustrative embodiments are described as being 256 QAM, the present disclosure may be extended and applied to other modulation orders, such as 64 QAM, according to the performance of the wireless communications device 120 or RF transient time, without limitation thereto. For example, a LUT based on 256 QAM may include a LUT based on 64 QAM, depending on circumstances.

Figure 3A:
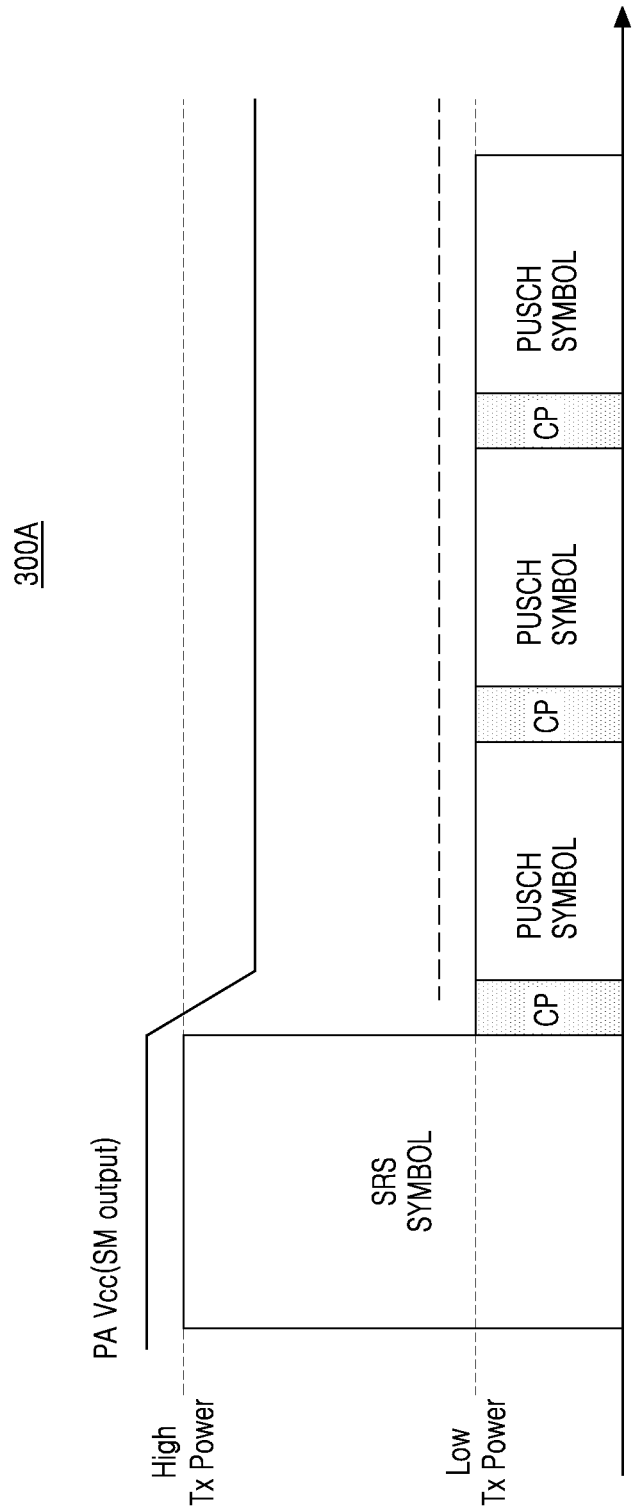
FIGS. 3A, 3B and 3C are signal diagrams, where
Figure 3B:
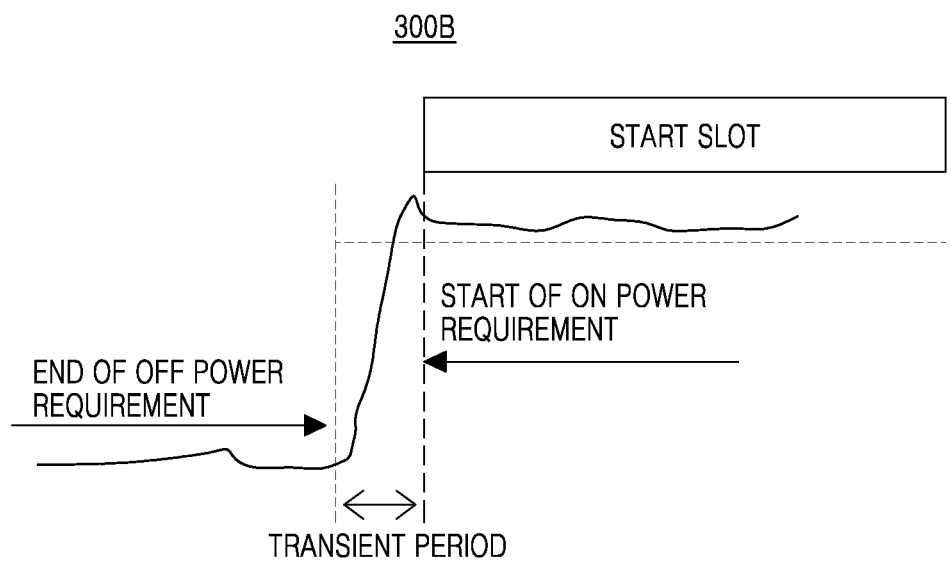
Figure 3C:
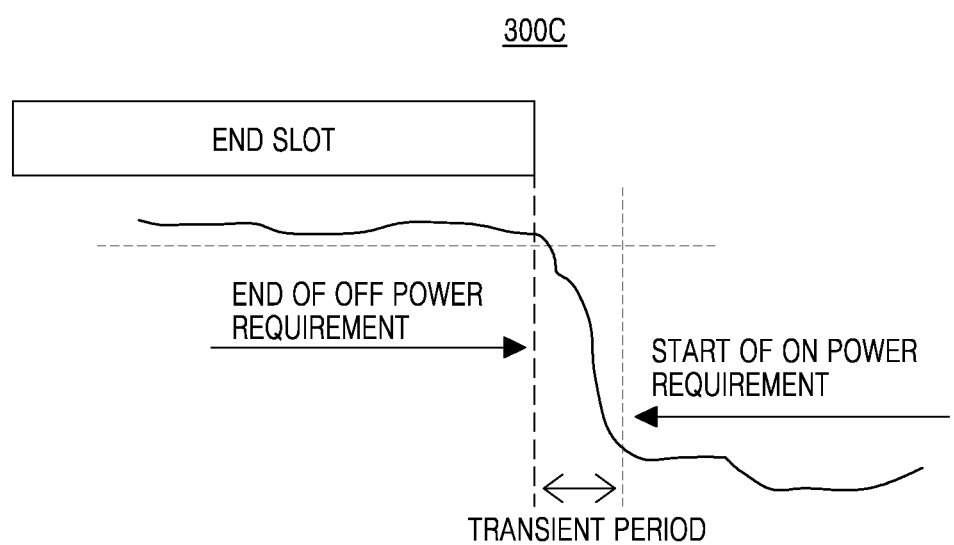

FIG. 3A illustrates an example of an operation of a wireless communications device according to transmission of a sounding reference signal (SRS) symbol and a physical uplink shared channel (PUSCH) symbol according to an embodiment. FIGS. 3B and 3C illustrate an example of an RF transient time according to an embodiment.

Referring to FIG. 3A, uplink signals are indicated generally by the reference numeral 300A. When uplink signals 300A are consecutively transmitted. In detail, after an SRS symbol is transmitted, PUSCH symbols are consecutively transmitted. When there is a change in Tx power, while the uplink signals are being consecutively transmitted, a transient time interval may occur in analog blocks. Such a transient time may be referred to as an RF transient time. Referring to FIG. 3A, because the Tx power of the SRS and the Tx power of the PUSCH are different, there is a change in the TX power during consecutive Tx symbol periods. Accordingly, a transient time interval may occur.

Because the required EVM (%) decreases as the modulation order increases, when the transient time is greater than a CP size, data throughput may decrease as the modulation order increases. When the RF transient time is less than or equal to the CP size, a receiver removes the corresponding CP interval during demodulation, so that the RF transient time may not affect data reception.

The wireless communications device (120 in FIG. 1) according to the present disclosure may control the RF transient time within the CP size. For example, the wireless communications device 120 according to the present disclosure may control the RF transient time within the CP size by controlling the range of change of an output voltage of the SM 260 (i.e., Vcc of the PA 280). For example, the wireless communications device 120 may use a LUT that controls the supply voltage of the SM 260. In an embodiment, the wireless communications device 120 may control the RF transient time within the CP size by using the LUT that limits the supply voltage of the SM 260 to a certain range. Accordingly, because the receiver removes the corresponding CP interval during demodulation, the RF transient time may not affect data reception. In addition, EVM degradation according to the RF transient time may be reduced and the performance of the 256 QAM EVM may be improved.

In detail, the wireless communications device 120 may control the RF transient time within the CP size by controlling the range of change in the output voltage of the SM 260 (i.e., Vcc of the PA 280). For example, when new ratio subcarrier spacing (NR SCS) is 30 kHz (when numerology is 1), the CP length may be 2.34 microseconds (usec). When the NR SCS is 60 kHz (numerology is 2), the CP length may be 1.17 usec. The wireless communications device 120 may control the RF transient time within the CP length described above by controlling the output voltage from the SM 260. Accordingly, the transient time may not overlap the effective symbol period, and distortion may not occur during uplink signal transmission. Also, EVM degradation may be improved.

Also, the wireless communications device 120 according to the present disclosure may use a LUT that optimizes a PA bias current according to Tx power. For example, the wireless communications device 120 may optimize the bias current of the PA 280 by using the LUT based on 256 QAM, while limiting the range of a change in the output voltage from the SM 260. Accordingly, the efficiency of power consumed by the wireless communications device 120 may be improved.

The wireless communications device 120 may control an output voltage for an uplink channel. For example, the wireless communications device 120 may control the output voltage from the SM 260 for an uplink channel including SRS, PUSCH, a physical uplink control channel (PUCCH), a physical random access channel (PRACH), and the like.

For example, referring to FIG. 3A, the wireless communications device 120 may control at least one of the output voltage from the SM 260 for SRS and an output voltage for PUSCH.

For example, referring to FIG. 3A, the wireless communications device 120 may control the RF transient time within the CP size by limiting the range of the output voltage of the SM 260 for the PUSCH. Accordingly, even if the PUSCH has a modulation order of 256 QAM, the EVM requirements may be satisfied. In addition, the wireless communications device 120 may optimize overall power efficiency by controlling the bias current of the PA 280 even if the range of the output voltage of the SM 260 is limited.

Referring to FIG. 3B, transmit signals are indicated generally by the reference numeral 300B. When there is a change in which Tx power increases while the wireless communications device 120 consecutively transmits signals, a transient time may occur in one or more analog blocks of the wireless communications device 120.

Referring to FIG. 3C, transmit signals are indicated generally by the reference numeral 300C. When there is a change in which Tx power decreases while the wireless communications device 120 consecutively transmits signals, a transient time may occur in one or more analog blocks of the wireless communications device 120.

Figure 4:
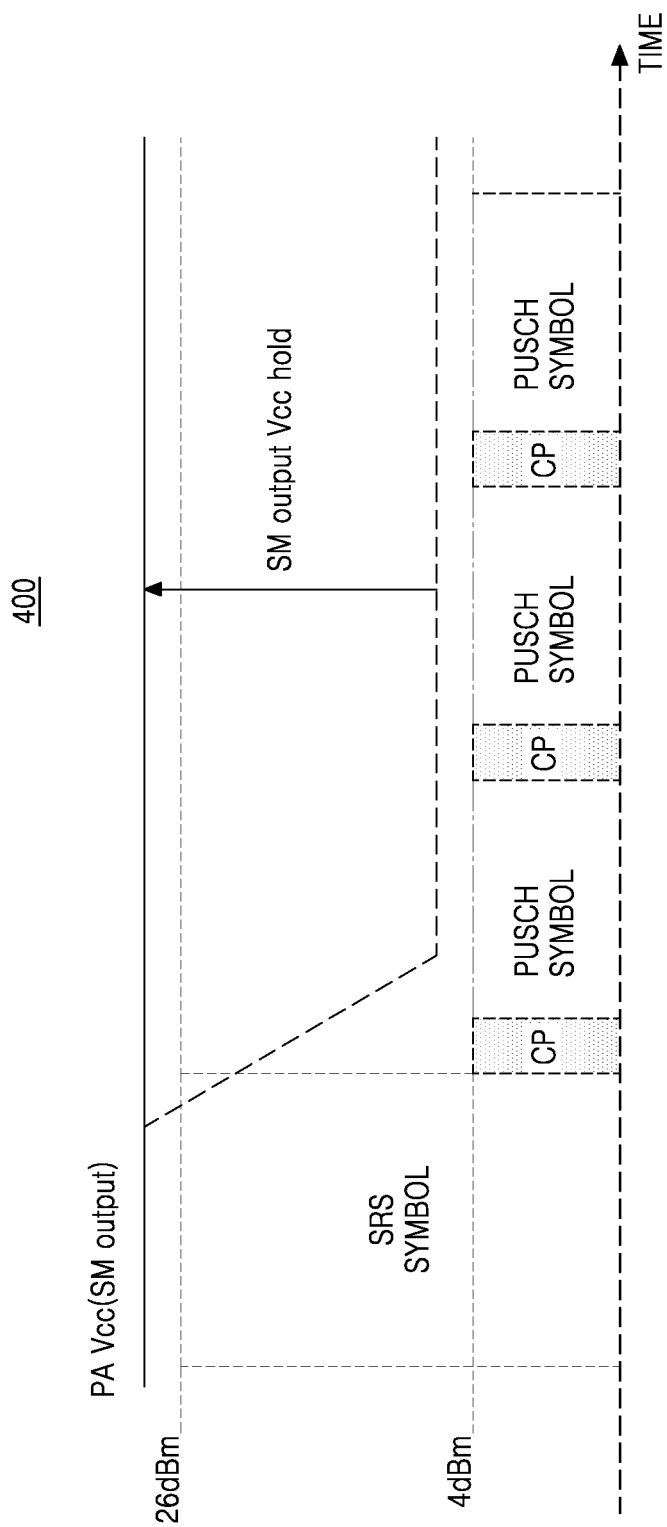
FIG. 4 is a signal diagram that illustrates operation of a wireless communications device for SRS symbol and PUSCH symbol transmission, according to an embodiment.

FIG. 4 illustrates an example of an operation of a wireless communications device according to SRS symbol and PUSCH symbol transmission according to an embodiment.

Referring to FIG. 4, uplink signals are indicated generally by the reference numeral 400. The uplink signals 400 are consecutively transmitted. In detail, after an SRS symbol is transmitted, the PUSCH symbols are consecutively transmitted. When there is a change in Tx power while uplink signals are consecutively transmitted, a transient time interval may occur in analog blocks. Such a transient time may be referred to as an RF transient time. Referring to FIG. 4, because TX power of the SRS and the TX power of the PUSCH are different, there is a change in the TX power during a continuous transmission symbol period. Accordingly, a transient time period may occur.

The wireless communications device (120 in FIG. 1) according to the present disclosure may control the RF transient time within a CP size. For example, the wireless communications device 120 according to the present disclosure may control the RF transient time within the CP size by controlling the range of change in the output voltage of the SM 260 (i.e., Vcc of the PA 280). For example, the wireless communications device 120 may maintain a supply voltage of the SM 260. In an example, the wireless communications device 120 may maintain the supply voltage of the SM 260 for the previous symbol as it is in a subsequent symbol period even if the TX power is changed in the continuous symbol period allocated by 256 QAM. In this case, the wireless communications device 120 may control the RF transient time without a LUT based on 256 QAM. In addition, because there is no transient time of the SM 260, it may be very advantageous when the SCS is large and the CP period is short.

The SM output voltage control block (210 in FIG. 2) may determine whether to maintain the supply voltage of the SM 260. For example, the SM output voltage control block 210 may determine whether to maintain the SM output voltage for a previous symbol for a transmission symbol to which 256 QAM is allocated.

Referring to FIG. 4, even if TX power for the SRS symbol and TX power for the PUSCH are different, the wireless communications device 120 may maintain the supply voltage of the SM 260 for the SRS symbol even in the PUSCH symbol period as it is. In this case, the wireless communications device 120 may control the RF transient time within the CP size by controlling the output voltage of the SM 260 (i.e., Vcc of the PA 280) not to change.

When the NR SCS is 30 kHz (when numerology is 1), the CP length may be 2.34 usec to 2.86 usec. When the NR SCS is 60 kHz (numerology is 2), the CP length may be 1.17 usec to 1.56 sec. The wireless communications device 120 may control the RF transient time within the above-described CP length by maintaining the output voltage of the SM 260. Accordingly, the transient time may not overlap the effective symbol period, and distortion may not occur during uplink signal transmission. Also, EVM degradation may be improved.

Figure 5:
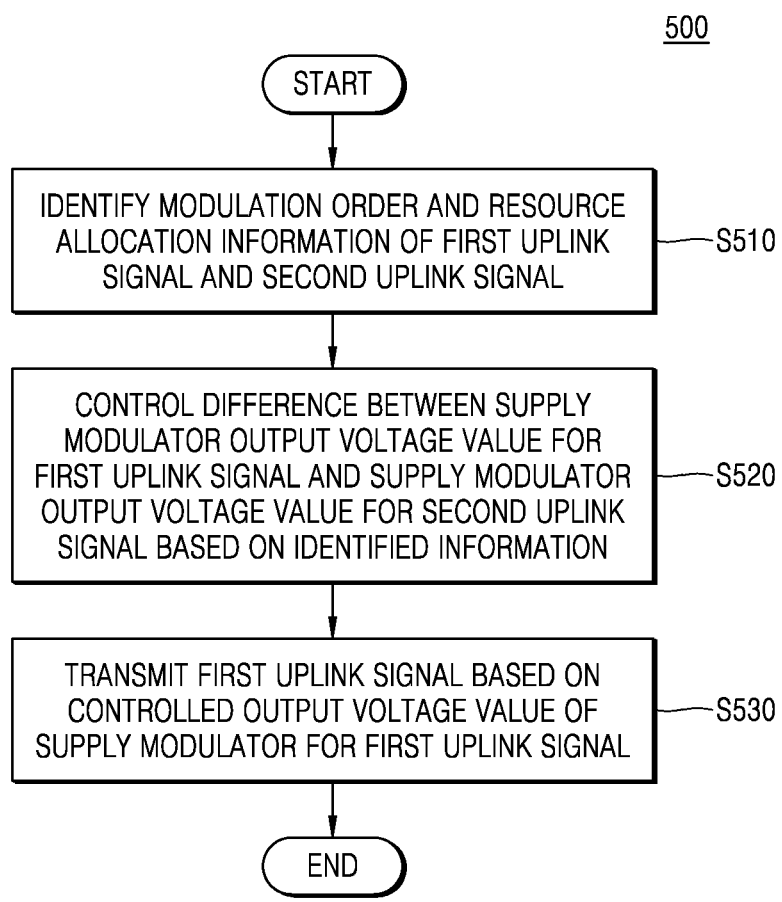
FIG. 5 is a flowchart diagram that illustrates an operation procedure of a wireless communications device according to an embodiment.

FIG. 5 illustrates an operation procedure of the wireless communications device 120 according to an embodiment.

Referring to FIG. 5, an operation procedure is indicated generally by the reference numeral 500. In operation S510, the wireless communications device (120 in FIG. 1) may identify a modulation order and resource allocation information of a first uplink signal and a second uplink signal. For example, the wireless communications device (120 in FIG. 1) may transmit a scheduling request (SR) to the BS (110 in FIG. 1) in order to transmit data to the BS 110. The BS 110 may transmit an uplink grant to the wireless communications device 120 in response to the scheduling request. In detail, the BS 110 may transmit the uplink grant to the wireless communications device 120 on a PDCCH through a DCI format 0_0 or DCI format 0_1 message. The wireless communications device 120 may receive the uplink grant and identify a resource and a modulation and coding scheme (MCS) to be used by data to be transmitted on the PUSCH. Accordingly, the wireless communications device 120 may identify a modulation order and resource allocation information of the first uplink signal and the second uplink signal. That is, the wireless communications device 120 may determine whether the first uplink signal and the second uplink signal are consecutively allocated and whether the first uplink signal is allocated by 256 QAM.

Any one of a reference signal, a control signal, and a data signal may be allocated as the first uplink signal and the second uplink signal. For example, the first uplink signal may be a PUSCH, and the second uplink signal may be an SRS.

In operation S520, the wireless communications device 120 may control a difference between a supply modulator output voltage value for the first uplink signal and a supply modulator output voltage value for the second uplink signal based on the identified information.

For example, the wireless communications device 120 may control the difference between the supply modulator output voltage value for the first uplink signal and the supply modulator output voltage value for the second uplink signal using an LUT based on 256 QAM. In an example, the wireless communications device 120 may determine whether the first uplink signal and the second uplink signal are allocated to consecutive symbols and the first uplink signal is allocated by 256 QAM and then control the output voltage of the SM 260 for the first uplink signal. The 256 QAM-based LUT may include supply modulator voltage information for the first uplink signal and PA bias current information for the first uplink signal. The 256 QAM-based LUT may be extended and applied to a BPSK-based LUT, a QPSK-based LUT, a 16 QAM-based LUT, and a 64 QAM-based LUT according to a modulation order and is not limited to the example of the 256 QAM-based LUT described above.

As another example, the wireless communications device 120 may maintain the supply modulator output voltage value for the second uplink signal in the first symbol period. In detail, the wireless communications device 120 may maintain the supply voltage of the SM 260 for a previous symbol as it is in a subsequent symbol period even if the TX power changes in the continuous symbol period.

As another example, the wireless communications device 120 may control at least one of the output voltage of the SM 260 based on 256 QAM, the bias current of the PA 280, and the total current consumption of the wireless communications device 120 without using an LUT.

In operation S530, the wireless communications device 120 may transmit the first uplink signal based on the controlled output voltage value of the supply modulator for the first uplink signal. That is, the wireless communications device 120 may transmit the first uplink signal based on the difference between the controlled supply modulator output voltage values.

Figure 6:
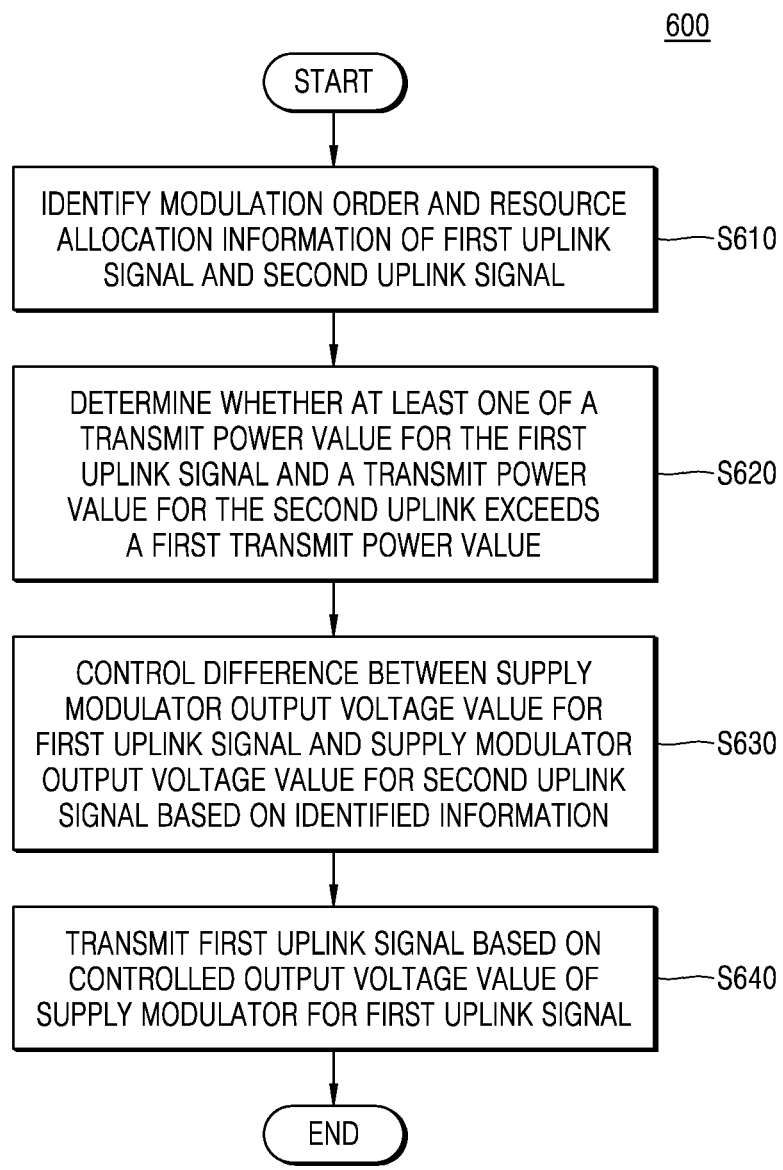
FIG. 6 is a flowchart diagram that illustrates an operation procedure of a wireless communications device according to an embodiment.

FIG. 6 illustrates an operation procedure of the wireless communications device 120 according to an embodiment.

Referring to FIG. 6, an operation procedure is indicated generally by the reference numeral 600. In operation S610, the wireless communications device (120 in FIG. 1) may identify a modulation order and resource allocation information of the first uplink signal and the second uplink signal.

In operation S620, the wireless communications device 120 may determine whether at least one of a TX power value for the first uplink signal and a TX power value for the second uplink signal exceeds a first TX power value. The TX power value for the first uplink signal may refer to a maximum value of power for the first uplink signal. The TX power value for the second uplink signal may refer to a maximum value of power for the second uplink signal. When at least one of the TX power value for the first uplink signal and the TX power value for the second uplink signal exceeds the first TX power value, the wireless communications device 120 may transmit the first uplink signal based on the controlled output voltage value of the supply modulator for the first uplink signal.

In operation S630, the wireless communications device 120 may control a difference between the supply modulator output voltage value for the first uplink signal and the supply modulator output voltage value for the second uplink signal based on the identified information.

In operation S640, the wireless communications device 120 may transmit the first uplink signal based on the controlled output voltage value of the supply modulator for the first uplink signal.

Figure 7:
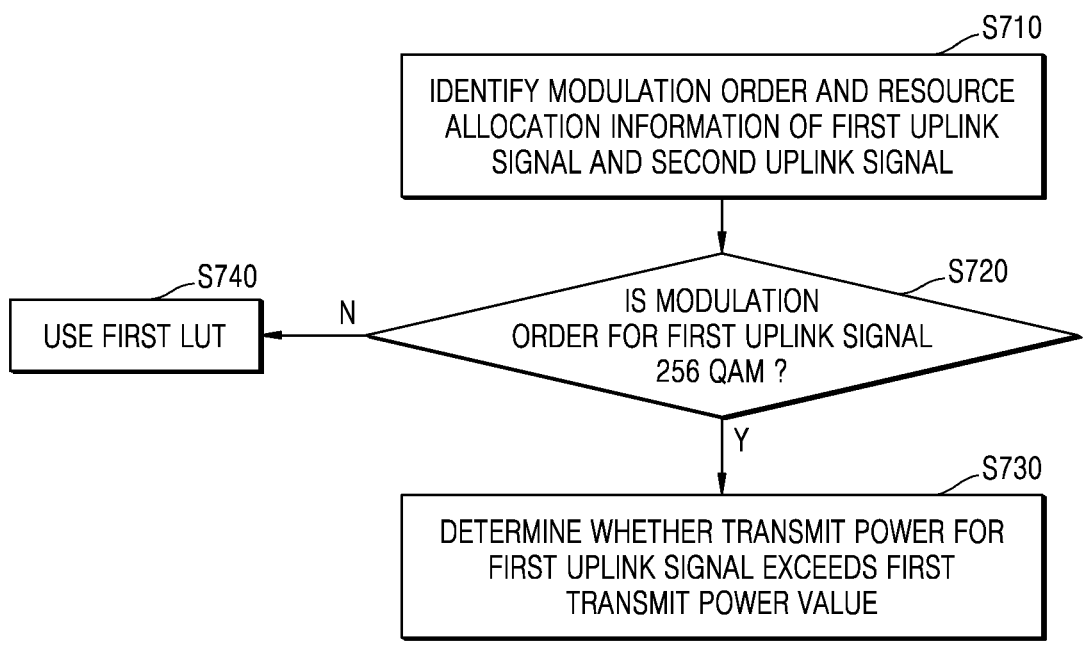
FIG. 7 is a flowchart diagram that illustrates an operation procedure of a wireless communications device according to an embodiment.

FIG. 7 illustrates an operation procedure of the wireless communications device 120 according to an embodiment.

Referring to FIG. 7, an operation procedure is indicated generally by the reference numeral 700. In operation S710, the wireless communications device (120 in FIG. 1) may identify a modulation order and resource allocation information of the first uplink signal and the second uplink signal. For example, the wireless communications device 120 may identify the modulation order and resource allocation information of the first uplink signal and the second uplink signal upon receiving an uplink grant from a BS. The first uplink signal and the second uplink signal may be consecutively allocated on a time axis, and the first uplink signal may have a modulation order of 256 QAM.

In operation S720, the wireless communications device 120 may determine whether the modulation order for the first uplink signal is 256 QAM.

In operation S730, the wireless communications device 120 may determine whether TX power for the first uplink signal exceeds a first TX power value. In detail, when the modulation order of the first uplink signal is 256 QAM (YES), the wireless communications device 120 may determine whether the TX power of the first uplink signal exceeds the first TX power.

In operation S740, the wireless communications device 120 may use a first LUT. In detail, when the modulation order of the first uplink signal is not 256 QAM (NO), the wireless communications device 120 may transmit the first uplink signal using the first LUT.

Figure 8:
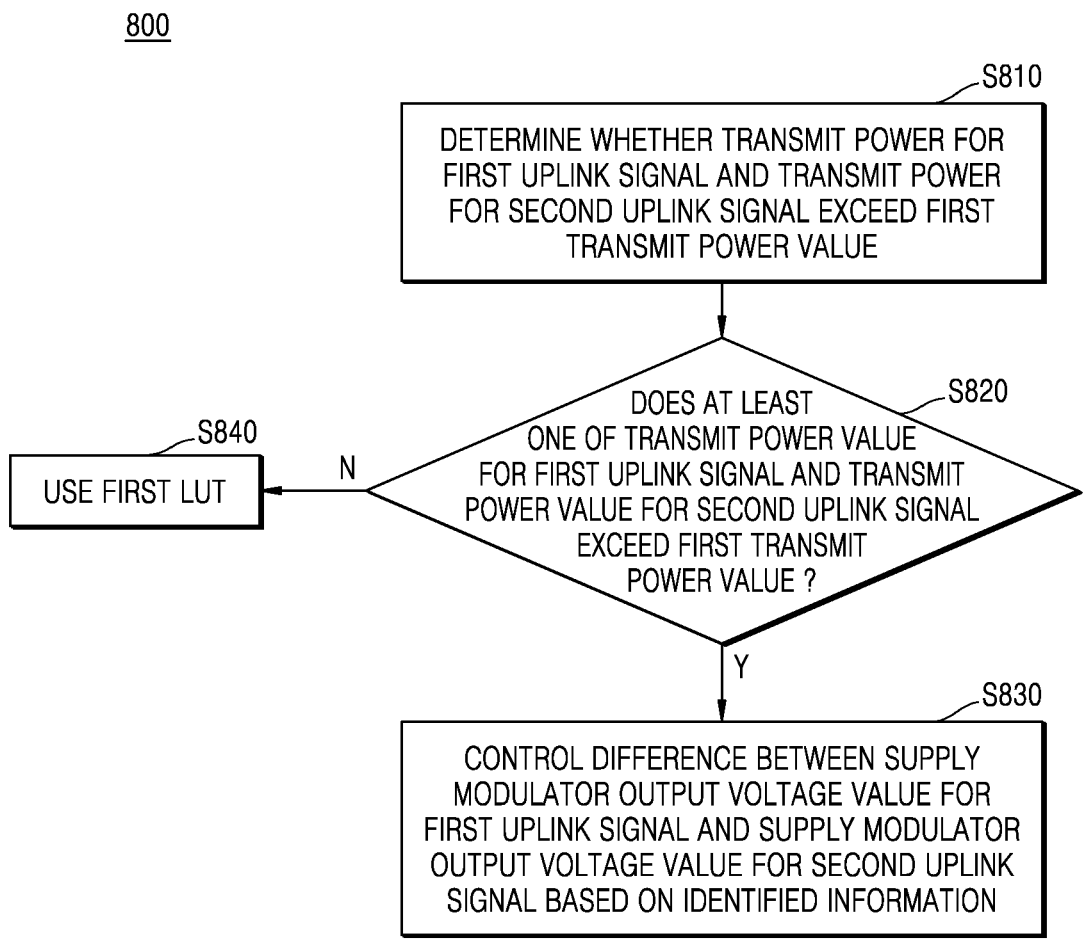
FIG. 8 is a flowchart diagram that illustrates an operation procedure of a wireless communications device according to an embodiment.

FIG. 8 illustrates an operation procedure of the wireless communications device 120 according to an embodiment.

Referring to FIG. 8, an operation procedure is indicated generally by the reference numeral 800. In operation S810, the wireless communications device (120 in FIG. 1) may determine whether at least one of the TX power value for the first uplink signal and the TX power value for the second uplink signal exceeds the first TX power value. The TX power value for the first uplink signal may refer to a maximum value of power for the first uplink signal. The TX power value for the second uplink signal may refer to a maximum value of power for the second uplink signal.

In operation S820, the wireless communications device 120 may determine whether at least one of the TX power value for the first uplink signal and the TX power value for the second uplink signal exceeds the first TX power value.

In operation S830, the wireless communications device 120 may control a difference between a supply modulator output voltage value for the first uplink signal and a supply modulator output voltage value for the second uplink signal based on the identified information. In detail, when at least one of the TX power value for the first uplink and the TX power value for the second uplink signal exceeds the first TX power value (YES), the wireless communications device 120 may control the difference between the supply modulator output voltage value for the first uplink signal and the supply modulator output voltage value for the second uplink signal based on the identified information. For example, the wireless communications device 120 may control a transition time for a change from the second uplink signal to the first uplink signal not to exceed a CP period based on the identified information.

In operation S840, the wireless communications device 120 may use the first LUT. In detail, when the TX power value for the first uplink and the TX power value for the second uplink signal do not exceed the first TX power value (NO), the wireless communications device 120 transmits the first LUT may be used to transmit the first uplink signal.

Figure 9:
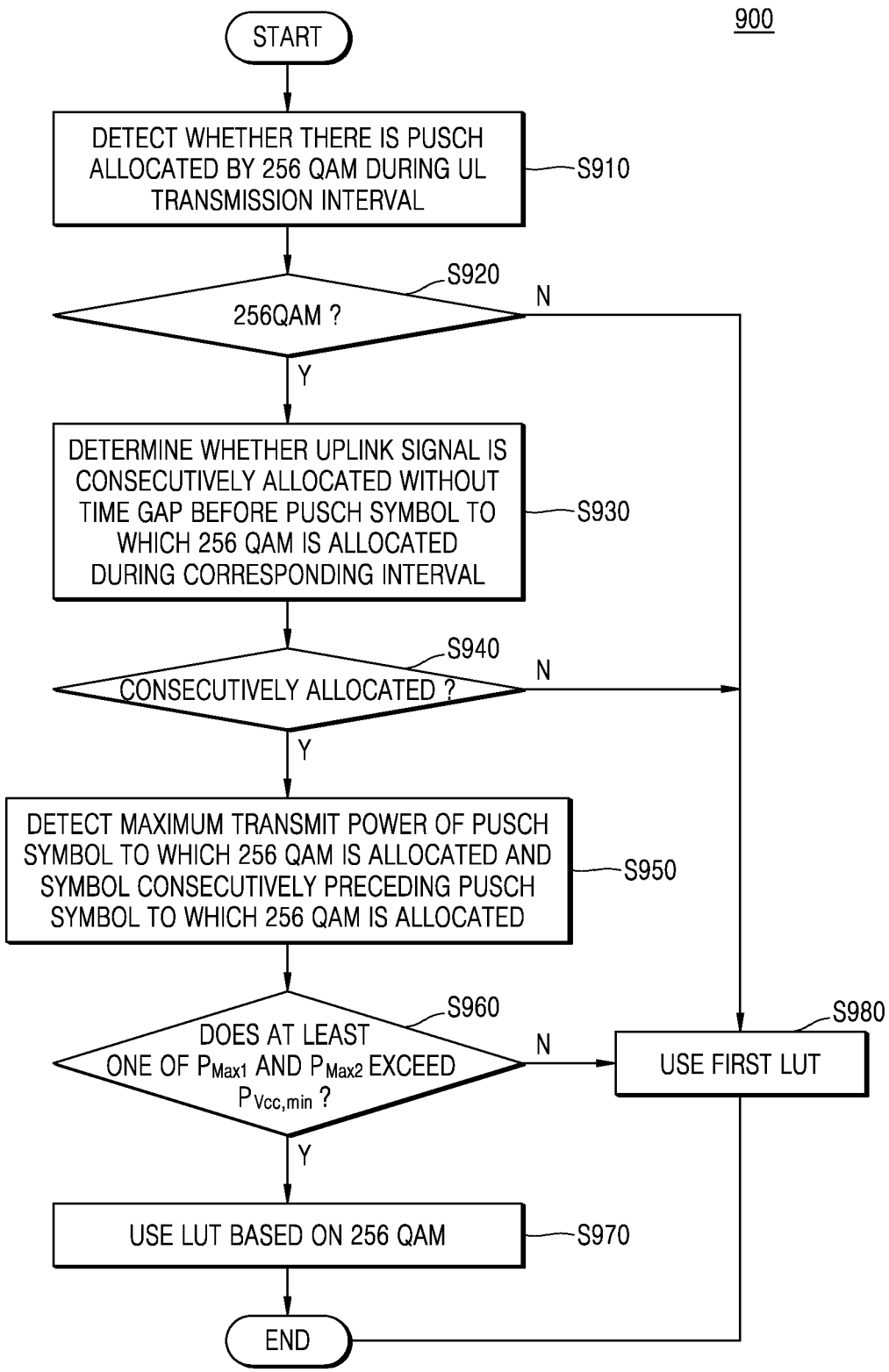
FIG. 9 is a flowchart diagram that illustrates an operation procedure of a user equipment (UE) and a base station (BS), according to an embodiment.

FIG. 9 illustrates an operation procedure of a UE and a BS according to an embodiment.

An operation procedure is indicated generally by the reference numeral 900. In operation S910, the wireless communications device 120 may detect whether there is a PUSCH allocated by 256 QAM during an uplink transmission period.

For example, the wireless communications device (120 in FIG. 1) may transmit a scheduling request (SR) to the BS 110 in order to transmit data to the BS (110 in FIG. 1). The BS 110 may transmit an uplink grant to the wireless communications device 120 in response to the SR. In detail, the BS 110 may transmit an uplink grant to the wireless communications device 120 on a PDCCH through a DCI format 0_0 or DCI format 0_1 message. The wireless communications device 120 may receive the uplink grant, and identify a resource and a modulation and coding scheme (MCS) to be used by data to be transmitted on the PUSCH. Accordingly, the wireless communications device 120 may detect whether there is a PUSCH allocated by 256 QAM during an uplink transmission period.

In operation S920, the wireless communications device 120 may determine whether there is a PUSCH allocated by 256 QAM during the uplink transmission period. If there is a PUSCH allocated by 256 QAM during the uplink transmission period (YES), the wireless communications device 120 may determine whether uplink signals are consecutively allocated without a time gap before the PUSCH symbol to which 265 QAM is allocated during the corresponding period. If there is no PUSCH allocated by 256 QAM during the uplink transmission period (NO), the wireless communications device 120 may use the first LUT. In detail, when there is no PUSCH allocated to 256 QAM, the wireless communications device 120 may transmit uplink signals using the first LUT. The first LUT may include at least one of a LUT based on CP-OFDM and a LUT based on DFT-s-OFDM.

In operation S930, the wireless communications device 120 may determine whether the uplink signals are consecutively allocated without a time gap before the PUSCH symbol to which 265QAM is allocated during the corresponding period. For example, the wireless communications device 120 may receive an uplink grant from the BS 110, and determine whether an uplink signal is allocated to a symbol consecutively preceding a PUSCH symbol to which 256 QAM is allocated, based on the received uplink grant.

In operation S940, when an uplink signal is allocated to the symbol consecutively preceding the PUSCH symbol to which 256 QAM is allocated (YES), the wireless communications device 120 may detect a maximum TX power of the PUSCH symbol to which 256 QAM is allocated. When an uplink signal is not allocated to the symbol consecutively preceding the PUSCH symbol to which 256 QAM is allocated (NO), the wireless communications device 120 may transmit the uplink signals using the first LUT.

In operation S950, the wireless communications device 120 may detect a maximum TX power $P_{Max1}$ of the PUSCH symbol to which 256 QAM is allocated and a maximum TX power $P_{Max2}$ of the symbol consecutively preceding the PUSCH symbol to which 256 QAM is allocated. That is, the wireless communications device 120 may detect the maximum TX power of the consecutively transmitted uplink symbols. Also, the wireless communications device 120 may determine whether a transient time in the corresponding transmission period presents a challenge for a receiver to receive signals based on the maximum TX power of the symbol period including the PUSCH symbol to which 256 QAM is allocated and the symbol consecutively preceding the PUSCH symbol to which 256 QAM is allocated. In detail, the wireless communications device 120 may compare the maximum TX power value of the PUSCH symbol to which 256 QAM is allocated and the maximum TX power value of the symbol consecutively preceding the PUSCH symbol to which 256 QAM is allocated, with a first TX power value.

In operation S960, if at least one of the maximum TX power value $P_{Max1}$ of the PUSCH symbol to which 256 QAM is allocated and the maximum TX power value $P_{Max2}$ of the symbol consecutively preceding the PUSCH symbol to which 256 QAM is allocated is greater than the first TX power value $P_{vcc,min}$, the wireless communications device 120 may determine to use the LUT based on 256 QAM. The wireless communications device 120 may transmit an uplink signal using the LUT based on 256 QAM (S970). In detail, the wireless communications device 120 may transmit a PUSCH symbol to which 256 QAM is allocated by using a LUT based on 256 QAM. If the maximum TX power value $P_{Max1}$ of the PUSCH symbol to which 256 QAM is allocated and the maximum TX power value $P_{Max2}$ of the symbol consecutively preceding the PUSCH symbol to which 256 QAM is allocated are smaller than or equal to the first TX power value, the wireless communications device 120 may use the first LUT. The wireless communications device 120 may transmit an uplink signal using the first LUT (S980).

FIGS. 10A to 10D illustrate example operations of the wireless communications device 120 according to an embodiment.

Figure 10A:
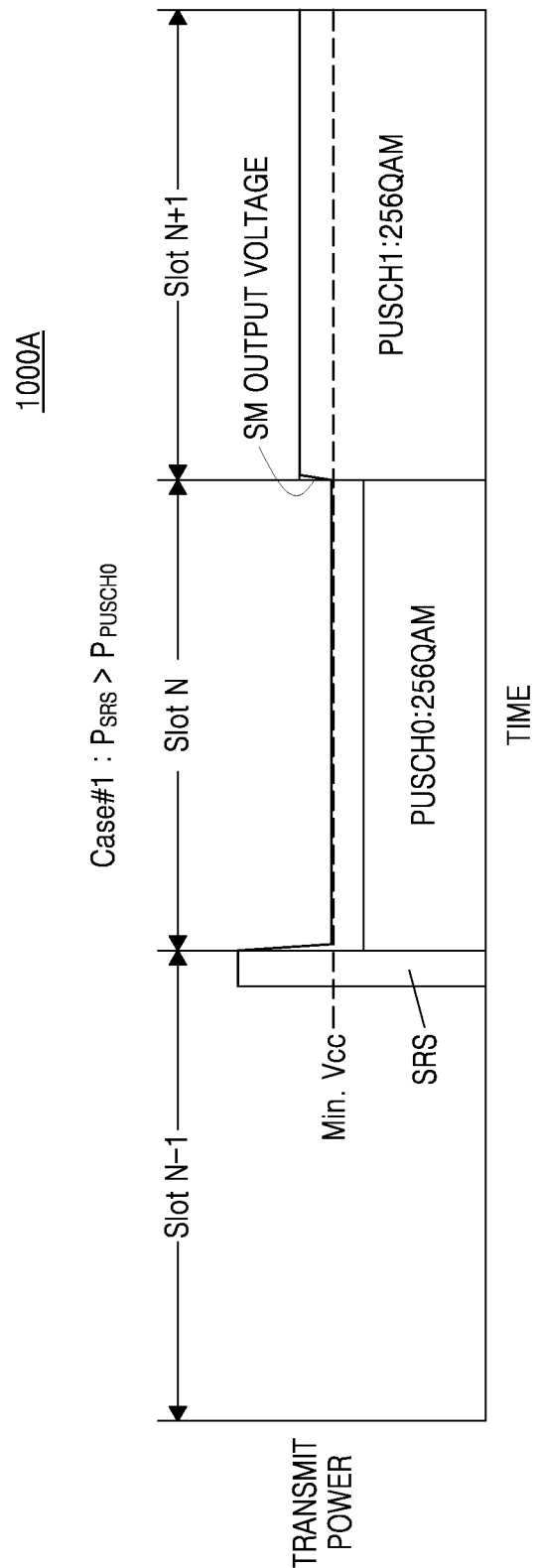
FIGS. 10A to 10D are signal diagrams that illustrate operations of a wireless communications device according to an embodiment.
Figure 10B:
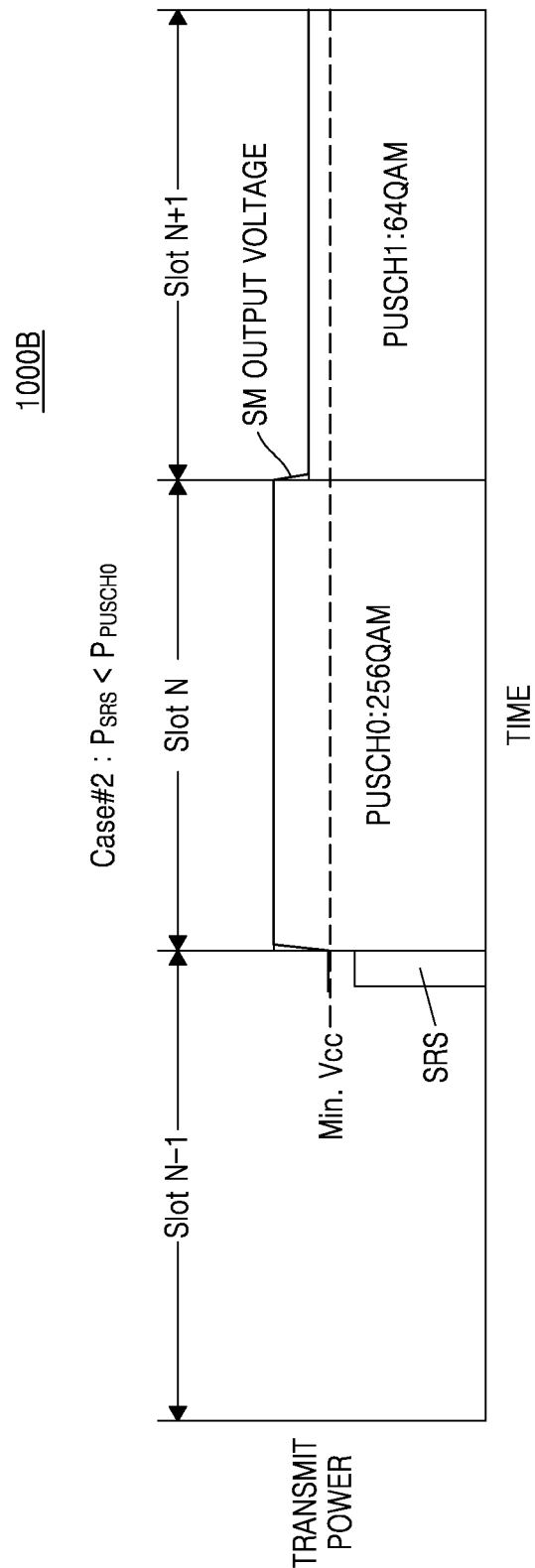

FIGS. 10A and 10B illustrate a case in which the wireless communications device 120 may use a LUT based on 256 QAM. Referring to FIGS. 10A and 10B other uplink signals are consecutively allocated without a time gap before a 256 QAM PUSCH signal in a UL slot period. In detail, PUSCH symbols of slot N are allocated by 256 QAM. An SRS is allocated to the last symbol of slot N−1. The SRS symbol consecutively precedes the first PUSCH symbol of slot N.

Referring to FIG. 10A, uplink signals are indicated generally by the reference numeral 1000A. TX power of the SRS transmission symbol is higher than PUSCH TX power of the slot N. Accordingly, there is a change in TX power during a continuous transmission period. Accordingly, RF transient time may occur, and the wireless communications device 120 may determine whether the RF transient time presents a challenge for a receiver to actually receive a signal. Referring to FIG. 10A, an SM output voltage is higher than Min.Vcc. Min.Vcc may refer to a threshold value of an SM output voltage at which the transient time described above with reference to FIG. 2 does not occur. Because at least one of the TX power in the PUSCH slot and the TX power in the SRS symbol is higher than $P_{vcc,min}$ (a first TX power value), the wireless communications device 120 may transmit the PUSCH using the LUT based on 256 QAM. The wireless communications device 120 may use a 256 QAM-based LUT for one or more PUSCH symbols of the slot N consecutively following the SRS symbol. The wireless communications device 120 may reduce the RF transient time within a CP period by controlling the output voltage of the SM 260 using the LUT based on 256 QAM.

Referring to FIG. 10B uplink signals are indicated generally by the reference numeral 1000B. The TX power of the SRS transmission symbol is lower than the PUSCH TX power of the slot N. Accordingly, there is a change in TX power during a continuous transmission period. Accordingly, RF transient time may occur, and the wireless communications device 120 may determine whether the RF transient time presents a challenge for the receiver to actually receive a signal. Referring to FIG. 10B the SM output voltage is higher than Min.Vcc. Also, because at least one of the TX power in the PUSCH slot and the TX power in the SRS symbol is higher than $P_{vcc,min}$ (the first TX power value), the wireless communications device 120 may transmit the PUSCH using the LUT based on 256 QAM. The wireless communications device 120 may use the 256 QAM-based LUT for one or more PUSCH symbols of a slot N consecutively following the SRS symbol. The wireless communications device 120 may reduce the RF transient time within the CP period by controlling the output voltage of the SM 260 using the LUT based on 256 QAM.

Figure 10C:
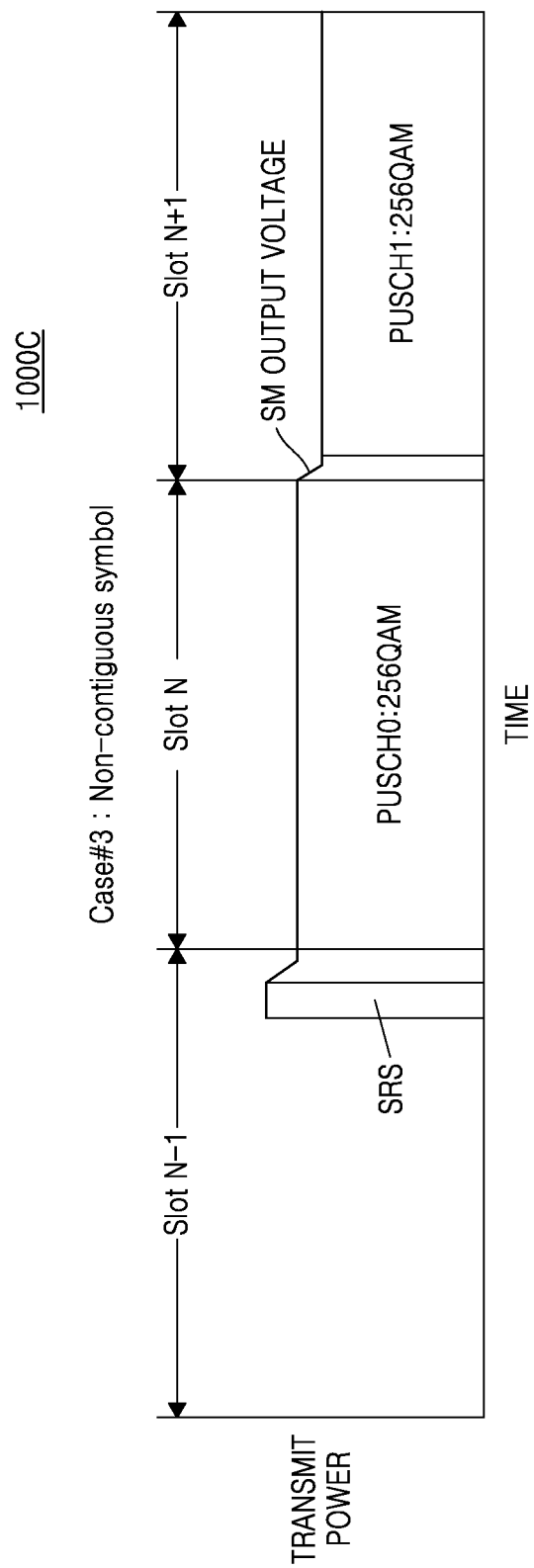

In FIG. 10C, uplink signals are indicated generally by the reference numeral 1000C. This is a case in which an uplink signal is allocated to each slot, but there is a time gap before a PUSCH to which 256 QAM is allocated. In this case, a transient time according to the output voltage of the SM may be included in a time gap without uplink allocation. Accordingly, the transient time may not affect the receiver to receive the uplink signal.

Figure 10D:
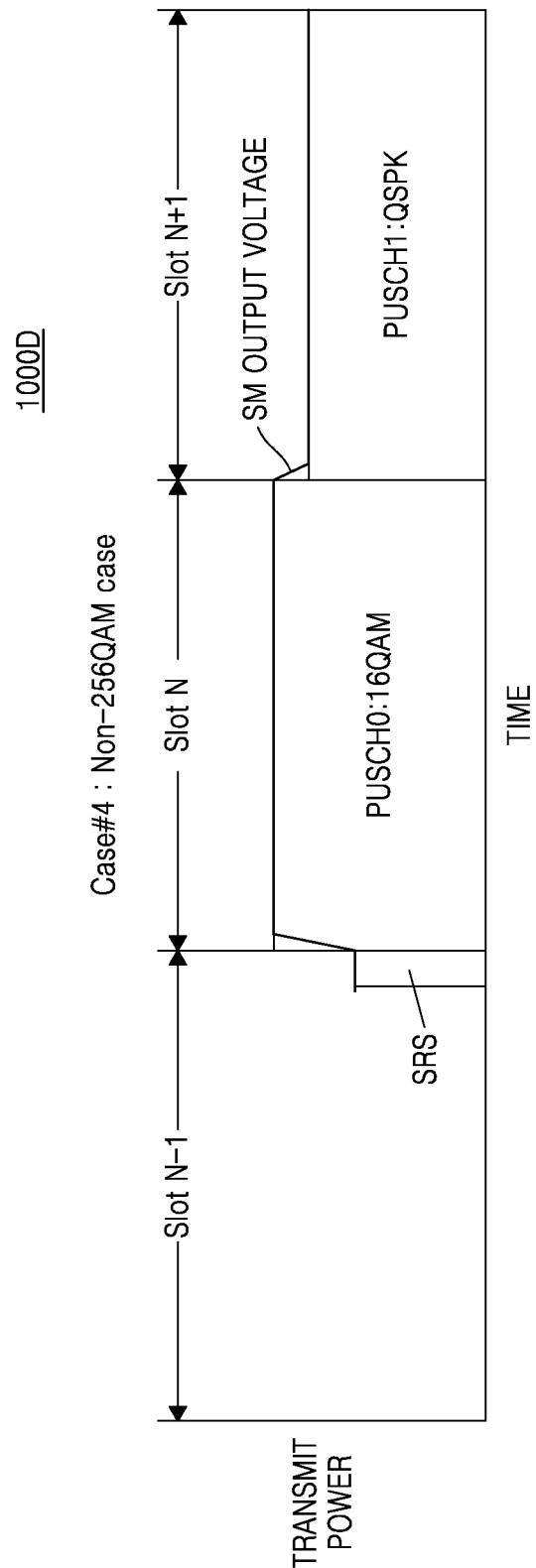

In FIG. 10D, uplink signals are indicated generally by the reference numeral 1000D. This illustrates a case in which uplink signals are consecutively allocated but 256 QAM is not allocated. 16QAM is allocated to the PUSCH of slot N. In this case, if the RF transient time including the transient time of the SM 260 increases, EVM degradation may occur. However, the EVM degradation may not significantly affect when the receiver decodes the corresponding signal. That is, the EVM degradation may not affect UE throughput. Accordingly, the wireless communications device 120 may transmit the PUSCH using the first LUT.

Figure 11:
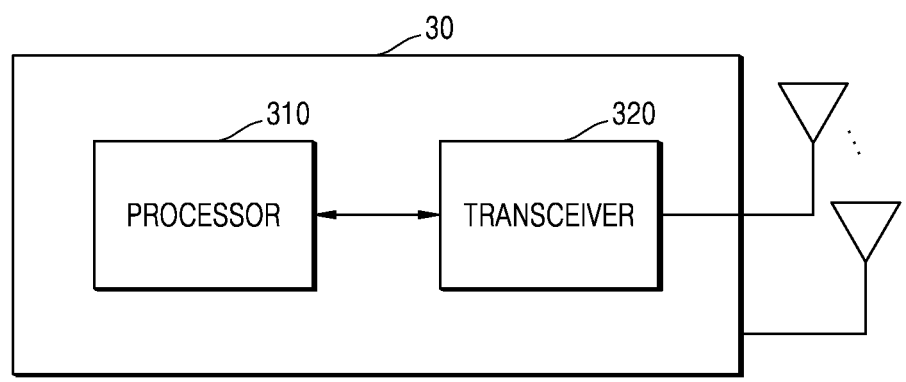
FIG. 11 is a block diagram illustrating a wireless communications device according to an embodiment.

FIG. 11 illustrates a wireless communications device according to an embodiment.

Referring to FIG. 11, a wireless communications device is indicated generally by the reference numeral 30. The wireless communications device 30 (e.g., 120 in FIG. 1) may include one or more processors 310 and one or more transceivers 320. The processor 310 may control the transceiver 320 and may be configured to implement an operation method and operation flowcharts of the wireless communications device 120 of the inventive concept. The wireless communications device 120 may include a plurality of antennas, and the transceiver 320 may transmit/receive a radio signal through one or more antennas. At least some of the plurality of antennas may correspond to a transmit antenna. The transmit antenna may transmit a radio signal to an external device (e.g., another UE or BS) other than the wireless communications device 120. The at least some of the other of the plurality of antennas may correspond to receive antennas. The receive antenna may receive a radio signal from the external device.

For example, the wireless communications device 120 may include at least one processor 310 connected to the transceiver 320 and the transceiver 320. The at least one processor 310 may identify a modulation order and resource allocation information of a first uplink signal transmitted in a first symbol and a second uplink signal transmitted in a second symbol preceding the first symbol. The at least one processor 310 may control a difference between a supply modulator output voltage value for the first uplink signal and a supply modulator output voltage value for the second uplink signal based on the identified information. The at least one processor 310 may transmit the first uplink signal based on the controlled difference between the output voltage values through the transceiver 320.

Figure 12:
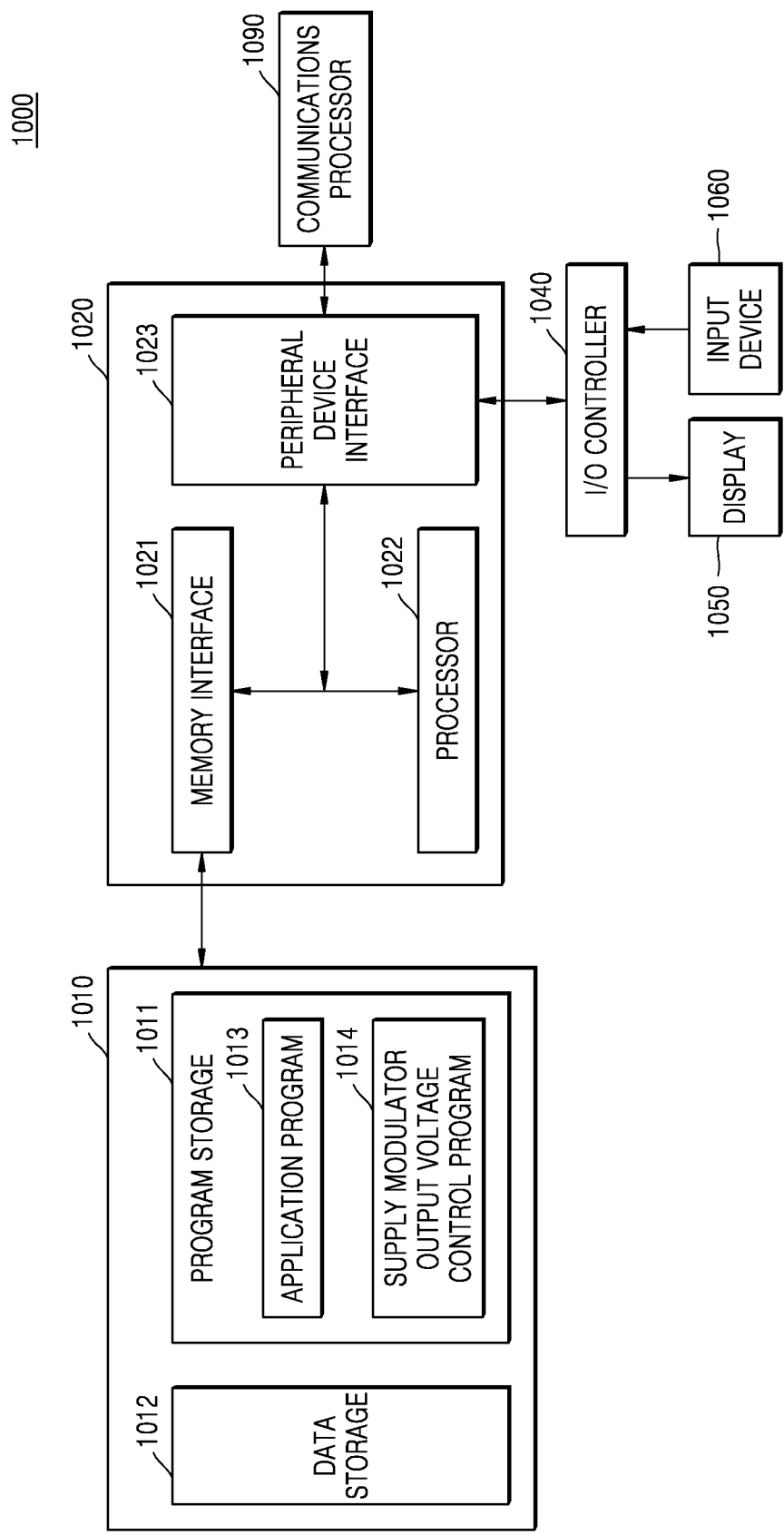
FIG. 12 is a block diagram illustrating an electronic device according to an embodiment.

In FIG. 12, an electronic device according to an embodiment Is indicated generally by the reference numeral 1000. Referring to FIG. 12, the electronic device 1000 may include a memory 1010, a processor unit 1020, an input/output (I/O) controller 1040, a display 1050, an input device 1060, and a communications processor 1090. Here, the memory 1010 may be provided as a plurality Of memories. Each component is described as follows.

The memory 1010 may include a program storage 1011 for storing a program for controlling an operation of an electronic device and a data storage 1012 for storing data generated during a program execution. The data storage 1012 may store data required for an operation of an application program 1013 and a supply modulator output voltage control program 1014. The program storage 1011 may include the application program 1013 and supply modulator output voltage control program 1014. Here, the program included in the program storage 1011 may be expressed as an instruction set as a set of instructions.

The application program 1013 includes an application program operating in an electronic device. That is, the application program 1013 may include instructions of an application driven by the processor 1022. The supply modulator output voltage control program 1014 may control an output voltage of the supply modulator of the electronic device 1000 according to embodiments.

A peripheral device interface 1023 may control connection between an I/O peripheral device of a BS and the processor 1022 and the memory interface 1021. The processor 1022 controls the BS to provide a corresponding service using at least one software program. In this case, the processor 1022 may execute at least one program stored in the memory 1010 to provide a service corresponding to the at least one program.

The I/O controller 1040 may provide an interface between an I/O device, such as the display 1050 and the input device 1060, and the peripheral device interface 1023. The display 1050 displays status information, input characters, moving pictures, and still pictures. For example, the display 1050 may display application program information driven by the processor 1022.

The input device 1060 may provide input data generated by selection of an electronic device to the processor unit 1020 through the I/O controller 1040. In this case, the input device 1060 may include a keypad including at least one hardware button and a touch pad for sensing touch information. For example, the input device 1060 may provide touch information, such as a touch sensed through a touch pad, a touch movement, and a touch release, to the processor 1022 through the I/O controller 1040. The electronic device 1000 may include a communications processor 1090 that performs communications functions for voice communications and/or data communications.

It shall be understood that the modulation and coding schemes (MCSs) are not limited to those described herein for illustrative purposes. Moreover, the type and range of wireless communications is not limited to the illustrative embodiments described herein, such as may be applicable to cellular communications. For example, a WiFi™ 802.11n embodiment may define how data is represented by an over-the-air (OTA) shorter-range wireless waveform, such as by using 64 QAM. A WiFi™ 802.11ac embodiment may additionally employ 256 QAM, without limitation thereto. The 256 QAM may transmit significantly (e.g., 33%) more data within the signal than the 64 QAM, but may fall back to the 64 QAM scheme according to design criteria. 256 QAM may include two new data rates, MCS 9 and MCS 8, in addition to the MCS 7 and slower rates of 64 QAM. These higher MCS rates may achieve higher throughput in the same amount of airtime, for example.

While the present disclosure has been particularly shown and described with reference to illustrative embodiments thereof, it will be understood by those of ordinary skill in the pertinent art that various changes in form and details may be made therein without departing from the spirit and scope of the present disclosure as set forth in the following claims.

What is claimed is:

1. An operating method of a wireless communications device, the operating method comprising:
   identifying a modulation order and resource allocation information of a first uplink signal transmitted in a first symbol and a second uplink signal transmitted in a second symbol preceding the first symbol;
   controlling a difference between a supply modulator output voltage value for the first uplink signal and a supply modulator output voltage value for the second uplink signal, based on at least one of the identified modulation order or the identified resource allocation information; and
   transmitting the first uplink signal, based on the controlled difference between the supply modulator output voltage values.

2. The operating method of claim 1, further comprising:
   determining whether at least one of a transmit power value for the first uplink signal and a transmit power value for the second uplink exceeds a first transmit power value,
   wherein, when at least one of the transmit power value for the first uplink and the transmit power value for the second uplink exceeds the first transmit power value, the first uplink signal is transmitted based on the controlled difference between the supply modulator output voltage values.

3. The operating method of claim 1, wherein
   the identifying of the modulation order and the resource allocation information includes:
   transmitting a scheduling request to a base station; and
   receiving an uplink grant including a modulation and coding scheme (MCS) and resource allocation information from the base station.

4. The operating method of claim 1, wherein
   the identifying of the modulation order and resource allocation information includes:
   determining whether a modulation order of the first uplink signal is a first modulation order;
   when the modulation order of the first uplink signal is the first modulation order, determining whether the second symbol consecutively precedes the first symbol; and
   when the second symbol consecutively precedes the first symbol, transmitting the first uplink signal, based on the controlled difference between the supply modulator output voltage values.

5. The operating method of claim 4, wherein the controlling of the difference between the supply modulator output voltage values includes using a look-up table (LUT) based on the first modulation order.

6. The operating method of claim 5, wherein the LUT based on the first modulation order includes supply modulator voltage information for the first uplink signal and power amplifier (PA) bias current information for the first uplink signal.

7. The operating method of claim 6, wherein the first modulation order is any one of binary phase shift keying (BPSK), quadrature phase shift keying (QPSK), 16 quadrature amplitude modulation (QAM), 64 QAM, and 256 QAM.

8. The operating method of claim 1, wherein the controlling of the difference between the supply modulator output voltage values includes maintaining the supply modulator output voltage value for the second uplink signal in a first symbol period.

9. The operating method of claim 1, wherein the controlling of the difference between the supply modulator output voltage values includes controlling at least one of a supply modulator voltage for the first uplink signal and a PA bias current for the first uplink signal.

10. A terminal in a wireless communications system, the terminal comprising:
    a transceiver; and
    at least one processor connected to the transceiver,
    wherein the at least one processor is configured to identify a modulation order and resource allocation information of a first uplink signal transmitted in a first symbol and a second uplink signal transmitted in a second symbol preceding the first symbol,
    control a difference between a supply modulator output voltage value for the first uplink signal and a supply modulator output voltage value for the second uplink signal, based on at least one of the identified modulation order or the identified resource allocation information, and
    transmit the first uplink signal, based on the controlled difference between the supply modulator output voltage values via the transceiver.

11. The terminal of claim 10, wherein
    the processor is configured to determine whether at least one of a transmit power value for the first uplink signal and a transmit power value for the second uplink exceeds a first transmit power value, and
    to transmit the first uplink signal, based on the controlled difference between the supply modulator output voltage values, when at least one of the transmit power value for the first uplink and the transmit power value for the second uplink exceeds the first transmit power value.

12. The terminal of claim 10, wherein,
    in the identifying of the modulation order and the resource allocation information,
    the processor is configured to transmit a scheduling request to a base station through the transceiver and
    receive an uplink grant including a modulation and coding scheme (MCS) and resource allocation information from the base station.

13. The terminal of claim 10, wherein,
in the identifying of the modulation order and the resource allocation information,
the processor is configured to determine whether a modulation order of the first uplink signal is a first modulation order,
determine whether the second symbol consecutively precedes the first symbol, when the modulation order of the first uplink signal is the first modulation order, and
transmit the first uplink signal, based on the controlled difference between the supply modulator output voltage values, when the second symbol consecutively precedes the first symbol.

14. The terminal of claim 13, wherein,
in the controlling of the difference between the supply modulator output voltage values,
the processor is configured to use a look-up table (LUT) based on the first modulation order.

15. The terminal of claim 14, wherein the LUT based on the first modulation order includes supply modulator voltage information for the first uplink signal and power amplifier (PA) bias current information for the first uplink signal.

16. The terminal of claim 15, wherein the first modulation order is any one of binary phase shift keying (BPSK), quadrature phase shift keying (QPSK), 16 quadrature amplitude modulation (QAM), 64 QAM, and 256 QAM.

17. The terminal of claim 10, wherein,
in the controlling of the difference between the supply modulator output voltage values,
the processor maintains the supply modulator output voltage value for the second uplink signal in a first symbol period.

18. The terminal of claim 10, wherein,
in the controlling of the difference between the supply modulator output voltage values,
the processor controls at least one of a supply modulator voltage for the first uplink signal and a PA bias current for the first uplink signal.

19. A wireless communications device including a supply modulator and a 256 QAM detecting module, the wireless communications device comprising:
the supply modulator configured to supply a voltage to a power amplifier modulator; and
a 256 QAM detecting module configured to identify a modulation order and resource allocation information of a first uplink signal transmitted in a first symbol and a second uplink signal transmitted in a second symbol preceding the first symbol, control an output voltage value of the supply modulator for the first uplink signal, based on at least one of the identified modulation order or the identified resource allocation information, and control the wireless communications device to transmit the first uplink signal, based on the controlled output voltage value of the supply modulator for the first uplink signal,
wherein a modulation order of the first uplink signal is 256 QAM.

20. The wireless communications device of claim 19, wherein
the 256 QAM detecting module is configured to determine whether at least one of a transmit power value for the first uplink signal and a transmit power value for the second uplink exceeds a first transmit power value, and
when at least one of the transmit power value for the first uplink and the transmit power value for the second uplink exceeds the first transmit power value, the wireless communications device controls to transmit the first uplink signal, based on the controlled difference between the supply modulator output voltage values.

* * * * *